(12) United States Patent
Mistral et al.

(10) Patent No.: US 9,206,872 B2
(45) Date of Patent: Dec. 8, 2015

(54) UNFURLING STRUCTURE WITH KNOCK PREVENTION DEVICE

(71) Applicant: THALES, Neuilly-sur-Seine (FR)

(72) Inventors: Alain Mistral, Cannes la Bocca (FR); Silvain Legrand, Nice (FR); Gael Blons, Cannes la Bocca (FR)

(73) Assignee: Thales (FR)

( * ) Notice: Subject to any disclaimer, the term of this patent is extended or adjusted under 35 U.S.C. 154(b) by 0 days.

(21) Appl. No.: 14/135,237

(22) Filed: Dec. 19, 2013

(65) Prior Publication Data

US 2014/0175720 A1    Jun. 26, 2014

(30) Foreign Application Priority Data

Dec. 21, 2012    (FR) ...................................... 12 03558

(51) Int. Cl.
  *F16F 1/36*    (2006.01)
  *B64G 1/22*    (2006.01)
  *F16F 1/373*    (2006.01)

(52) U.S. Cl.
  CPC . *F16F 1/36* (2013.01); *B64G 1/222* (2013.01); *F16F 1/373* (2013.01)

(58) Field of Classification Search
  USPC ............ 267/139, 140, 152, 153; 16/273, 291; 52/173.3; 248/148, 200, 205.1, 226.11, 248/274.1
  See application file for complete search history.

(56) References Cited

U.S. PATENT DOCUMENTS

| 3,291,249 | A | * | 12/1966 | Bays | .............................. 181/114 |
| 4,088,120 | A | * | 5/1978 | Anderson | ..................... 126/573 |
| 5,086,541 | A | | 2/1992 | Auternaud et al. | |
| 5,269,248 | A | * | 12/1993 | Lee | ............................... 114/219 |
| 5,326,082 | A | * | 7/1994 | Ecktman et al. | ........... 267/64.27 |
| 5,988,609 | A | | 11/1999 | Young | |
| 6,158,088 | A | | 12/2000 | Bulboaca | |
| 8,151,414 | B2 | | 4/2012 | Baudasse et al. | |
| 8,511,615 | B2 | * | 8/2013 | Baudasse et al. | .......... 244/172.6 |

FOREIGN PATENT DOCUMENTS

| FR | 2635077 A1 | 2/1990 |
| FR | 2902763 A1 | 12/2007 |
| GB | 2198209 A | 6/1988 |
| WO | 86/00051 A1 | 1/1986 |
| WO | 2006/072332 A1 | 7/2006 |

\* cited by examiner

*Primary Examiner* — Christopher Schwartz
(74) *Attorney, Agent, or Firm* — Baker & Hostetler LLP

(57) ABSTRACT

A structure comprises at least two unfurling panels and a knock prevention device intended to prevent the panels from knocking together when they are furled against one another. The knock prevention device comprises a one-piece element comprising two plates and arms connecting the two plates. A first of the two plates is fixed to the first panel. A second of the two plates forms a buffer against which the second panel comes to rest. The arms form an elastic element between the two plates.

7 Claims, 3 Drawing Sheets

UNFURLING STRUCTURE WITH KNOCK PREVENTION DEVICE

CROSS-REFERENCE TO RELATED APPLICATION

This application claims priority to foreign French patent application No. FR 1203558, filed on Dec. 21, 2012, the disclosure of which is incorporated by reference in its entirety.

FIELD OF THE INVENTION

The invention relates to a structure comprising at least two unfurling panels and a knock prevention device intended to prevent the panels from knocking together when furled against one another.

BACKGROUND

The invention is more particularly although not exclusively applicable to the field of space and notably to solar panel or flat antenna structures of satellites which structures are formed of various panels articulated together and which are deployed in space. Numerous other applications can be envisaged both in the field of space and on the earth.

The panels are articulated to one another by means of self-propelled articulations such as those described for example in patent applications FR 2 635 077 and FR 2 902 763. In the furled position, before and during launch of the satellite, ties keep the panels furled against one another. When the satellite is deployed into space, the ties are released thus allowing the structure to unfurl.

In the furled position, notably when the satellite is being launched, the structure is subjected to numerous mechanical stresses such as vibrations. The solar panels or the flat antenna elements are often of large size and the vibrations may cause adjacent panels to knock together potentially leading to damage such as cracking or even breakages.

In order to limit these risks, shock-absorbing pins may be arranged, notably at the corners of the panels, to prevent the panels from knocking together. These pins are fixed to a first panel and an adjacent second panel rests against the pins when the structure is in the furled position.

This solution is lengthy and tricky to implement. In addition, deployment anomalies occur because the shock-absorbing pin sticks to the panel against which the pin rests.

SUMMARY OF THE INVENTION

The invention seeks to alleviate all or some of the above-mentioned problems by proposing to replace the pin with a one-piece element that is easy to use. The material chosen will be a material that reduces the risk of sticking.

To this end, the subject of the invention is a structure comprising at least two unfurling panels and a knock prevention device intended to prevent the panels from knocking together when they are furled against one another, wherein the knock prevention device comprises a one-piece element comprising two plates and arms connecting the two plates, wherein a first of the two plates is fixed to the first panel, wherein a second of the two plates forms a buffer against which the second panel comes to rest and wherein the arms form an elastic element between the two plates.

BRIEF DESCRIPTION OF THE DRAWINGS

The invention will be better understood and other advantages will become apparent from reading the detailed description of one embodiment provided by way of example, which description is illustrated by the attached drawing in which.

For the sake of clarity, in the various figures the same elements will bear the same references.

DETAILED DESCRIPTION

Figure 1A:
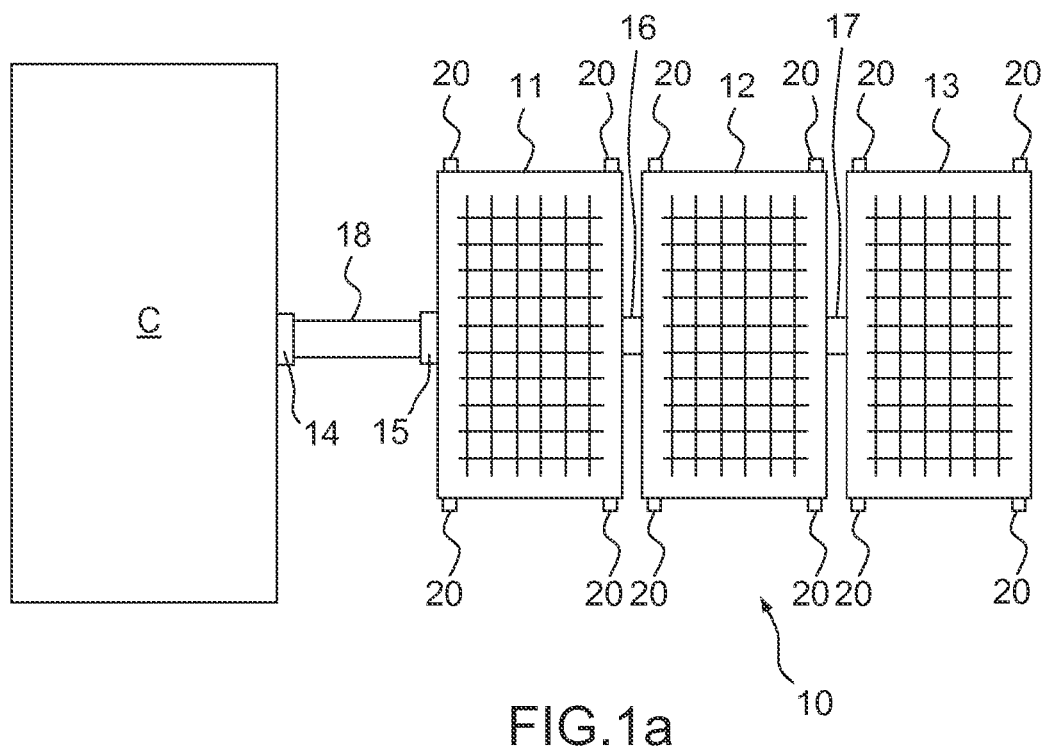
FIGS. 1a and 1b depict a panel structure in the deployed position in the case of FIG. 1a and in the furled position in the case of FIG. 1b.
Figure 1B:
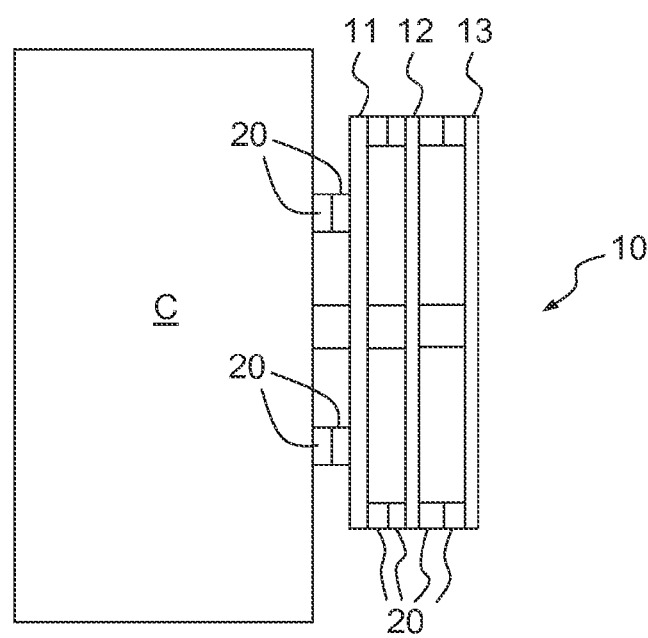

FIG. 1 depicts a structure 10 comprising three panels 11, 12 and 13 intended to equip a satellite the body of which bears the reference C. These may, for example, be solar panels intended to supply the electrical energy needs of the satellite or alternatively antenna panels intended to transmit or receive telecommunications signals. The structure has several articulations allowing it to be deployed. More specifically, when the satellite is launched, the panels 11, 12 and 13 are furled against one another as depicted in FIG. 1b and once the satellite has reached its position in space, the panels are deployed. To do that, the structure in the example depicted comprises four articulations 14, 15, 16 and 17. The articulation 14 connects an arm 18 of the structure 10 to the body C of the satellite in which notably electronic equipment is installed. The articulation 15 connects the arm 18 to the panel 11, the articulation 16 connects the panels 11 and 12 and the articulation 17 connects the panels 12 and 13. The panels 11, 12 and 13 are flat and rectangular. They extend in the plane of FIG. 1a in the deployed position. The articulations 14, 15, 16 and 17 have a degree of freedom to rotate and this allows the panels 11, 12 and 13 to be concertina-folded against one another. The articulations are advantageously self-propelled as described for example in patent applications FR 2 635 077 and FR 2 902 763.

As explained above, during launch, the satellite is subjected to severe mechanical stresses such as significant vibrations. To prevent the panels in their furled position from knocking together during the launch and, more generally, when subjected to mechanical stresses, the structure 10 comprises distance pieces secured to the panels 11, 12 and 13 and acting as buffers. In the example depicted, each of the panels is fitted with four distance pieces 20. The distance pieces 20 are advantageously identical so that the mass-production thereof can be standardized. A distance piece 20 is mounted at each of the corners of a panel. In the furled position, a distance piece 20 of a panel butts against another distance piece 20 of the adjacent panel. The distance pieces can also act as buffers between a panel and the body of the satellite. The number of distance pieces 20 may be greater. It is defined according to the dimensions of the panels, their rigidity and the mechanical stresses they have to be able to withstand. It is equally possible to lay out the distance pieces 20 in such a way that a distance piece 20 fixed to one panel can bear directly against the adjacent panel. One function of the distance pieces 20 is to keep the panels some distance apart when the structure is in the furled position.

Figure 2:
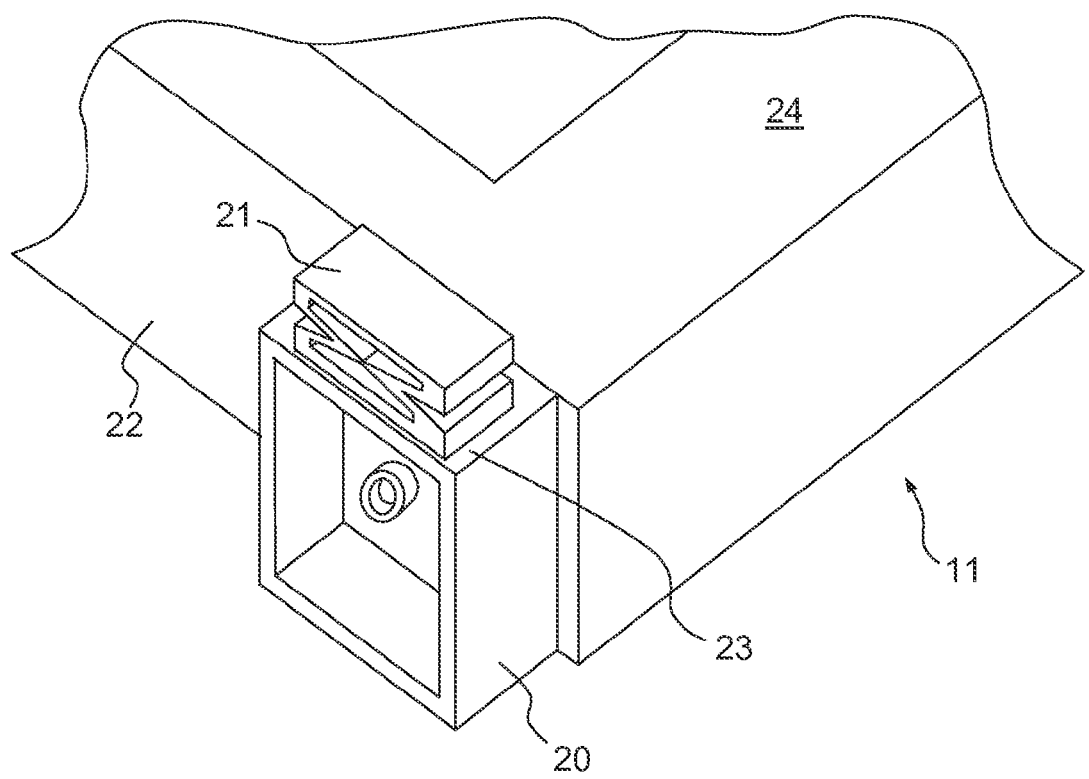
FIG. 2 depicts a detail of the mounting of a knock prevention device.

FIG. 2 depicts in detail a distance piece 20 mounted on one of the panels, for example the panel 11. The distance piece 20 is equipped with a knock prevention device 21. The distance piece 20 is, for example, formed of a rigid block attached by a screw to an edge face 22 of the panel 11. The knock prevention device 21 is fixed to a face 23 of the block that forms the distance piece 20, the face 23 being perpendicular to the edge face 22 and therefore parallel to the largest planar surface 24 of the panel 11. In other words, the knock prevention device 21 is fixed to the first panel by means of a distance piece 20.

The panel 12, adjacent to the panel 11, is fitted with a distance piece 20 intended to come into contact with the device 21 when the panels are furled against one another. The distance piece 20 of the panel 12 may be not provided with a knock prevention device 21, at least on that one of its faces that comes into contact with the knock prevention device 21 of the panel 11. In this embodiment, the device 21 is able to absorb the shock of contacts between two distance pieces 20 facing each other.

By way of an alternative, it is possible to fix the knock prevention device 21 directly to the panel 11. In such an instance, the device 21 is fixed to the face 24 of the panel 11 and the device 21 is intended to press against the adjacent panel 12 on one of its largest faces facing the face 24.

Figure 3:
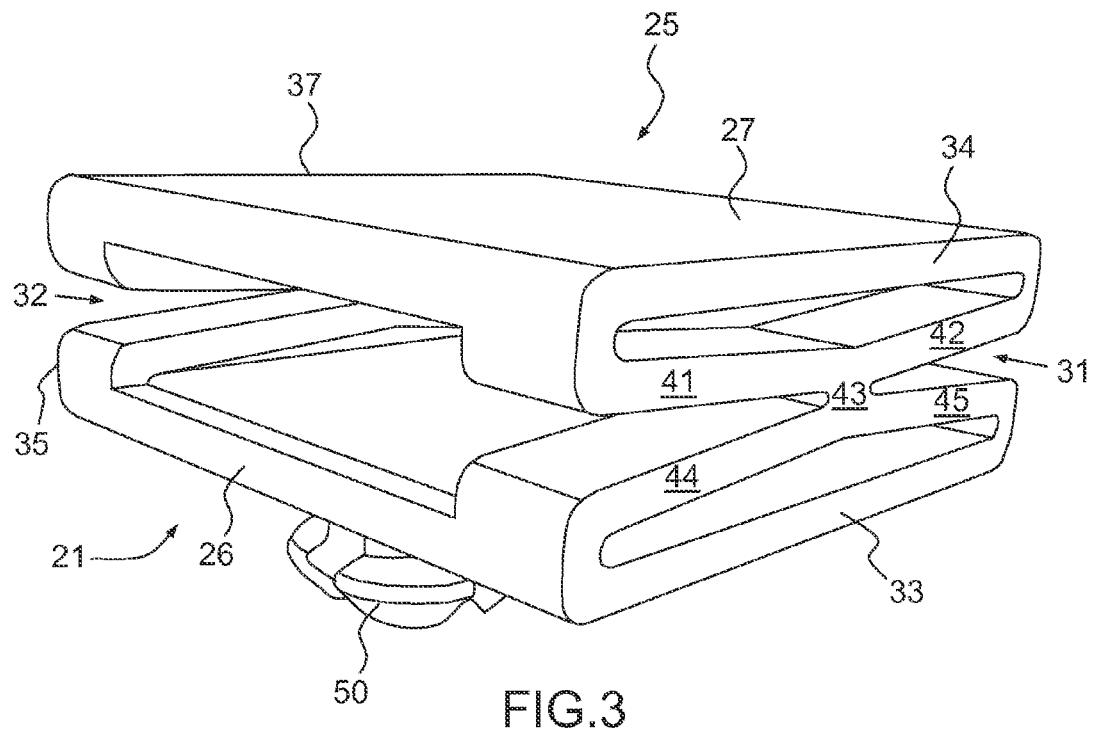
FIGS. 3 and 4 depict the knock-prevention device alone.

FIG. 3 is a perspective depiction of a knock prevention device 21 on its own. The device 21 comprises a one-piece element 25 formed of two plates 26 and 27 and an elastic element connecting the two plates 26 and 27. The plate 26 is fixed to the space piece 20 of the panel 11 and the plate 27 is intended to butt against the space piece 20 of the panel 12. The elastic element is formed of arms connecting the two plates 26 and 27. Elasticity is ensured by the flexing of the arms. The elasticity makes it possible to avoid any direct knocks between the panels 11 and 12 or between the distance pieces 20 of the two panels 11 and 12.

Advantageously the arms are split between two groups 31 and 32. The group 31 connects one side 33 of the plate 26 and one side 34 of the plate 27. The group 32 connects one side 35 of the plate 26 and one side 37 of the plate 27. In the case of the plate 26, the side 33 is the opposite side to the side 35, and in the case of the plate 27, the side 34 is the opposite side to the side 37. The two groups of arms are symmetric in order to allow the two plates 26 and 27 to move together substantially parallel when the panel 12 comes into abutment against the panel 11.

In the embodiment depicted, each of the groups 31 and 32 comprises four arms arranged in the form of the letter X, with a base anchored in the plate 26 and a top anchored in the plate 27.

More specifically, the two groups 31 and 32 are identical. The group 31, clearly visible in FIG. 3, comprises arms 41 and 42 fixed at one of their ends to the plate 27 each at one end of the side 34. The other ends of the arms 41 and 42 are fixed together to form a central node 43. The group 31 further comprises the arms 44 to 45 fixed at one of their ends to the plate 26 and each fixed at one end of the side 33. The other ends of the arms 44 and 45 are fixed together to the central node 43. When the plates 26 and 27 move together under the effect of a force applied to the plate 27 at right angles to it, the four arms of each group 31 and 32 flex. The node 43 moves closer to the two plates 26 and 27 and may go so far as to come into contact with the plates 26 and 27. If the force to which the device 21 is subjected is greater than the force required to bring the node 43 into contact with the plates 26 and 27, the material of which the one-piece element 25 is made becomes compressed. The sizing of the one-piece element 25 takes this possibility of compression into consideration.

The one-piece element 25 is for example made of a plastic material that can be moulded. By way of an alternative, for shorter production runs the one-piece element 25 could be produced by three-dimensional polymerization of a resin, the polymerization being brought about from a numerical model of the one-piece element 25. Such a method of manufacture is also known by the English-language term of "direct manufacturing". If the invention is to be used on board a satellite, use may for example be made of a polyether ether ketone also known by its abbreviation PEEK. This material has good mechanical properties compatible with a harsh environment such as that of space.

Figure 4:
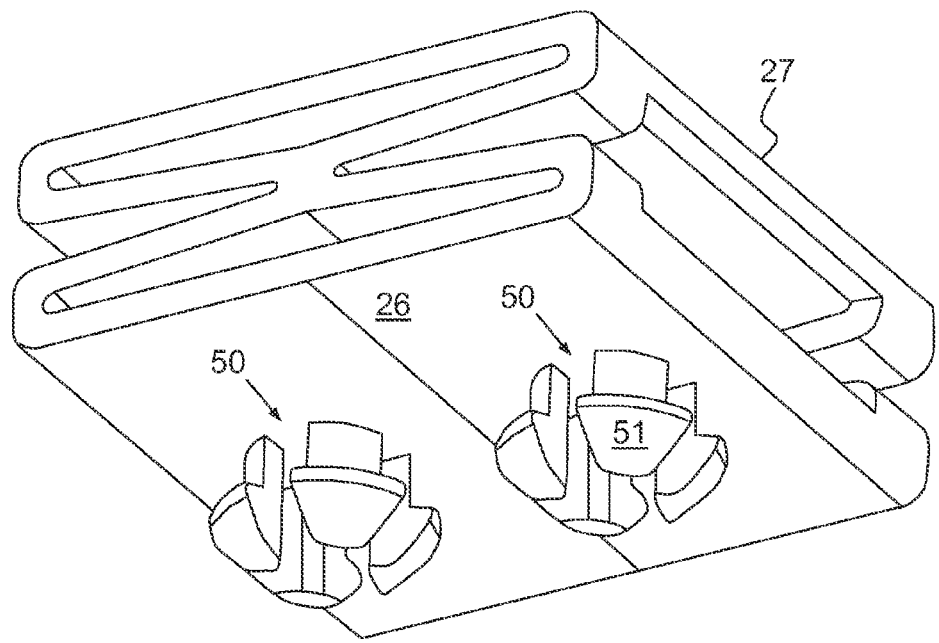

The plate 26 may be fixed to the distance piece or to the panel by adhesive bonding. However, this type of fixing requires tricky handling operations. By way of preferred alternative, the plate 26 may be fixed using a rivet or using at least one clip 50. To guarantee a certain orientation of the one-piece element 25, use may be made of two clips 50, as shown in FIG. 4. A clip means the use of a member that allows fixing to be performed through elastic deformation. More specifically, the clip 50 forms a protrusion from the plate 26, which protrusion is intended to enter a through-hole made in the distance piece 20. The protrusion ends in a hook 51 intended to pass through the hole and retain the one-piece element 25. As the protrusion 50 is inserted into the hole in the distance piece 20, the hook 51 is moved aside by elastic deformation and then returns to its initial shape after it has emerged from the hole, thus holding the one-piece element 25 against the distance piece 20. In the example depicted, the clip 50 comprises four protrusions, each ending in a hook 51.

Advantageously, a volume delimited by the two plates 26 and 27 and by the two groups of arms 31 and 32 is filled with an elastomer. It is possible for example to choose an elastomer of the rubber type having shock-absorbing properties, this allowing some of the energy of any impact that may occur when two panels knock against one another to be dissipated.

The invention claimed is:

1. A structure comprising:
at least two unfurling panels;
a knock prevention device intended to prevent the at least two unfurling panels from knocking together when they are furled against one another;
at least one articulation that connects the at least two unfurling panels,
wherein the knock prevention device includes a one-piece element including two plates and arms connecting the two plates,
wherein a first of the two plates is fixed to the first panel,
wherein a second of the two plates forms a buffer against which the second panel comes to rest,
wherein the arms form an elastic element between the two plates, and
wherein the at least one articulation is configured to include a degree of freedom of rotation and configured to be self-propelled such that the at least two unfurling panels are concertina-folded against one another in a furled position and extend along a plane in an unfurled position.

2. The structure according to claim 1, wherein the arms are split into two groups, the first of the two groups connecting a first side of the first plate and a first side of the second plate, the second of the two groups connecting a second side of the first plate and second side of the second plate, for each of the plates, the first side being the opposite side to the second side.

3. The structure according to claim 2, each of the groups comprising four arms arranged in the shape of the letter X, with a base anchored in the first plate and a top anchored in the second plate.

4. The structure according to claim 2, wherein a volume delimited by the two plates and the two groups is filled with an elastomer.

5. The structure according to claim 1, wherein the first of the two plates is fixed to the first panel using at least one clip.

6. The structure according to claim 1, wherein the first of the plates is fixed to the first panel by riveting.

7. The structure according to claim 1, wherein the first of the two plates is fixed to the first panel by a distance piece.

* * * * *